(12) United States Patent
Nakasuji

(10) Patent No.: US 6,202,454 B1
(45) Date of Patent: *Mar. 20, 2001

(54) ANTI-THEFT SECURITY CASE

(75) Inventor: Tamotsu Nakasuji, Nara (JP)

(73) Assignee: Tomato Land Display Systems, Inc., St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/310,075

(22) Filed: May 10, 1999

Related U.S. Application Data

(63) Continuation-in-part of application No. 08/870,769, filed on May 16, 1997, now Pat. No. 5,901,840.

(51) Int. Cl.$^7$ .................................................. E05B 65/00
(52) U.S. Cl. ............................... 70/57.1; 70/63; 206/1.5; 206/308.2
(58) Field of Search ................................ 70/57.1, 58, 63; 206/1.5, 308.2, 387.11

(56) References Cited

U.S. PATENT DOCUMENTS

| | | | |
|---|---|---|---|
| D. 329,594 | * | 9/1992 | Gregerson et al. . |
| 344,126 | * | 6/1886 | Meaker . |
| 1,950,165 | * | 3/1934 | DeLorenzo . |
| 2,293,942 | * | 8/1942 | Klahn . |
| 2,672,747 | * | 3/1954 | Craig . |
| 3,125,873 | * | 3/1964 | Robinson . |
| 3,272,325 | * | 9/1966 | Schoenmakers . |
| 3,348,668 | * | 10/1967 | Amatsu et al. . |
| 3,452,878 | * | 7/1969 | Smith . |
| 3,495,716 | * | 2/1970 | Gregory . |
| 3,504,652 | * | 4/1970 | Norman . |
| 3,570,676 | * | 3/1971 | Crosslen . |
| 3,613,413 | * | 10/1971 | Glass et al. . |
| 3,638,788 | * | 2/1972 | Solomon . |
| 3,700,098 | * | 10/1972 | Posso . |

(List continued on next page.)

FOREIGN PATENT DOCUMENTS

| | | | |
|---|---|---|---|
| 66317 | * | 8/1914 | (AT) . |
| 23 35 965 | * | 1/1975 | (DE) . |
| 24 33 570 | * | 1/1976 | (DE) . |
| 2801567 | * | 7/1979 | (DE) . |
| 954.843 | * | 10/1947 | (FR) . |
| 2 508 301 | * | 12/1982 | (FR) . |
| 1 373 004 | * | 11/1974 | (GB) . |
| 1 459 996 | * | 12/1976 | (GB) . |
| 2 037 157 | * | 7/1980 | (GB) . |
| 2 037 158 | * | 7/1980 | (GB) . |
| 54-057706 | * | 4/1979 | (JP) . |
| 55-45197 | * | 3/1980 | (JP) . |

*Primary Examiner*—Suzanne Dino Barrett
(74) *Attorney, Agent, or Firm*—Merchant & Gould P.C.

(57) ABSTRACT

The present disclosure relates to a security system for securing an object. The system includes a housing defining a region for storing the object. The housing includes a wall defining a plurality of through-holes. A locking member is mounted along the wall. The locking member is movable between a locked position and an unlocked position. Retaining members are connected to the locking member for retaining the locking member in the locked position. The retaining members are arranged and configured to resiliently move into the through-holes when the locking member is moved to the locked position. The system also includes an unlocking tool having unlocking members arranged and configured to fit within the through-holes. The retaining members are displaced from the through-holes by pressing the unlocking members into the through-holes such that the retaining members are pressed out of the through-holes. At least one of the unlocking members and the retaining members includes ramped surfaces arranged and configured to cause the locking member to move from the locked position toward the unlocked position after the retaining members have been displaced from the through-holes.

16 Claims, 13 Drawing Sheets

U.S. PATENT DOCUMENTS

| | | | |
|---|---|---|---|
| 3,722,236 | * | 3/1973 | Zelenko . |
| 3,736,777 | * | 6/1973 | Wirth . |
| 3,746,180 | * | 7/1973 | Spiroch et al. . |
| 3,776,374 | * | 12/1973 | Medendorp . |
| 3,828,922 | * | 8/1974 | Holkestad . |
| 3,871,516 | * | 3/1975 | Holkestad et al. . |
| 3,933,240 | * | 1/1976 | Humble . |
| 3,982,633 | * | 9/1976 | Pennington . |
| 3,994,395 | * | 11/1976 | Bennett-Robertson . |
| 4,047,410 | * | 9/1977 | Close . |
| 4,102,458 | * | 7/1978 | Fors . |
| 4,105,112 | * | 8/1978 | Graf . |
| 4,125,189 | * | 11/1978 | Fujimoto et al. . |
| 4,187,703 | * | 2/1980 | Ippoliti et al. . |
| 4,240,551 | * | 12/1980 | Osanai . |
| 4,241,859 | * | 12/1980 | Eames . |
| 4,243,142 | * | 1/1981 | Foreman . |
| 4,245,741 | * | 1/1981 | Holkestad . |
| 4,278,258 | * | 7/1981 | Fujita et al. . |
| 4,285,429 | * | 8/1981 | MacTavish . |
| 4,293,266 | * | 10/1981 | St. Lawrence et al. . |
| 4,299,870 | * | 11/1981 | Humble . |
| 4,303,159 | * | 12/1981 | Stone et al. . |
| 4,327,952 | * | 5/1982 | Cournoyer et al. . |
| 4,361,233 | * | 11/1982 | Holkestad . |
| 4,365,712 | * | 12/1982 | Oishi et al. . |
| 4,366,915 | * | 1/1983 | Seidler . |
| 4,381,836 | * | 5/1983 | Rivkin et al. . |
| 4,385,693 | * | 5/1983 | Gelardi et al. . |
| 4,466,540 | * | 8/1984 | Lotrous et al. . |
| 4,469,225 | * | 9/1984 | Takahashi . |
| 4,476,978 | * | 10/1984 | Saito . |
| 4,558,782 | * | 12/1985 | Iverson et al. . |
| 4,566,598 | * | 1/1986 | Fors . |
| 4,589,549 | * | 5/1986 | Hehn . |
| B 4,589,549 | * | 7/1994 | Hehn . |
| 4,628,713 | * | 12/1986 | Cecchi et al. . |
| 4,634,004 | * | 1/1987 | Mortensen . |
| 4,759,442 | * | 7/1988 | Gergerson et al. . |
| 4,834,238 | * | 5/1989 | Hehn et al. . |
| 4,865,190 | * | 9/1989 | Gregerson et al. . |
| 5,129,244 | * | 7/1992 | Wittman .............................. 70/57.1 |
| 5,277,308 | * | 1/1994 | Finke et al. . |
| 5,375,712 | * | 12/1994 | Weisburn . |
| 5,390,515 | * | 2/1995 | Essick ............................... 70/57.1 X |
| 5,680,782 | * | 10/1997 | Komatsu et al. ..................... 70/57.1 |
| 5,782,350 | * | 7/1998 | Weisburn et al. ..................... 70/63 X |
| 5,850,752 | * | 12/1998 | Lax ................................... 70/57.1 X |
| 5,901,840 | * | 5/1999 | Nakasuji ............................. 70/63 X |
| 5,934,114 | * | 8/1999 | Weisburn et al. ..................... 70/57.1 |

* cited by examiner

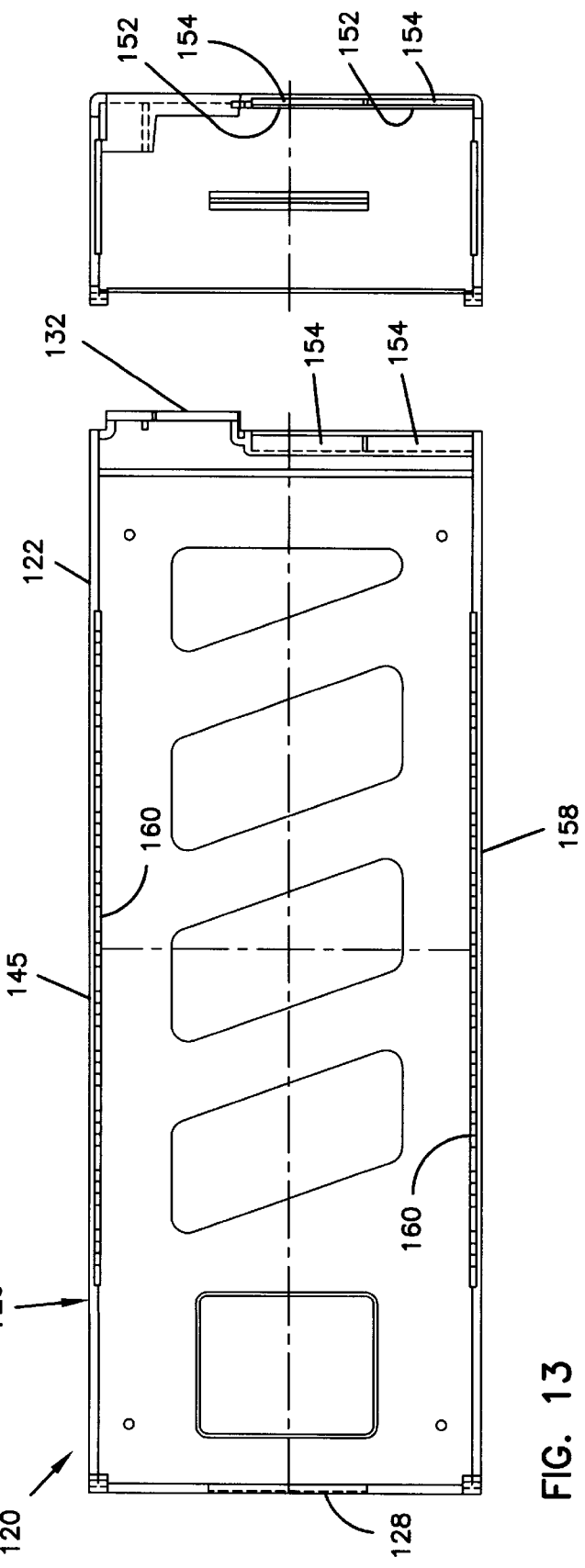

ANTI-THEFT SECURITY CASE

CROSS-REFERENCE TO RELATED APPLICATIONS

This application is a continuation-in-part of U.S. patent application Ser. No. 08/870,769 filed on May 16, 1997, now U.S. Pat. No. 5,901,840, issued May 11, 1999.

BACKGROUND OF THE INVENTION

1. Field of the Invention

The present invention relates to security cases or housings for preventing merchandise (e.g., compact disks, audio tapes, video disks/tapes, cigarettes, toys, data recording media, jewelry, etc.) from being stolen.

2. Prior Art

Retail shops and rental shops of compact disks, cassette tapes, etc. use special holders for displaying the containers of compact disks, cassette tapes, etc. FIG. 7 shows one of such holders.

This holder is composed of a holder main body 90, a container receiving member 91 provided at the bottom of the holder main body 90, and a lock mechanism 92. The holder main body 90 has an open area 90a at the side thereof for receiving and releasing the container. The container receiving member 91 is movable in and out of the holder main body 90 and then becomes immovable when the lock mechanism 92 engages the container receiving member 91, so that the container cannot be taken out of the holder main body 90. When, as seen from FIG. 8, a magnet 93 having strong attraction power causes a pin 92a of the lock mechanism 92 to move downward in FIG. 8 against the spring force of a spring 92b of the lock mechanism 92, the pin 92a is disengaged from the container receiving member 91, thus allowing the container to be removed from the holder main body 90.

This type of holder customarily has a theft detection tag (not shown) attached on the inner surface of the rear plate of the holder main body 90. When one attempts to steal the container in a holder from a shop, the theft detection tag attached to the holder is detected when passing through the detection gate installed at the exit of the shop.

Therefore, before taking the desired recorded medium contained in the container out of the shop, a shop clerk at the counter before the detection gate must first release the lock mechanism 92 of the holder and take the container out of the holder.

However, the holder described above is disadvantaged in that if a person (other than a shop clerk) has a magnet with strong attraction power, this person can easily release the lock mechanism 92. Thus, thefts cannot be prevented effectively despite the use of the detection gate.

SUMMARY OF THE INVENTION

One aspect of the present invention relates to a security system for securing an object. The system includes a housing defining a region for storing the object. The housing includes a wall defining a plurality of through-holes. A locking member is mounted along the wall. The locking member is movable between a locked position and an unlocked position. A plurality of retaining members are connected to the locking member for retaining the locking member in the locked position. The retaining members are arranged and configured to resiliently move into the through-holes when the locking member is moved to the locked position. The security system also includes an unlocking tool including unlocking members arranged and configured to fit within the through-holes. The retaining members are displaced from the through-holes by pressing the unlocking members into the through-holes such that the retaining members are pressed out of the through-holes. Either the unlocking members or the retaining members (or both) include ramped surfaces arranged and configured to cause the locking member to move from the locked position toward the unlocked position after the retaining members have been displaced from the through-holes.

BRIEF DESCRIPTION OF THE DRAWINGS

FIG. 12 shows a top, plan view of the lower half of the security case of FIG. 9;

FIG. 13 is a side, elevational view of the housing piece of FIG. 12;

FIG. 14 is a end elevational view of the housing piece of FIG. 12;

DETAILED DESCRIPTION OF THE PREFERRED EMBODIMENT

Figure 1:
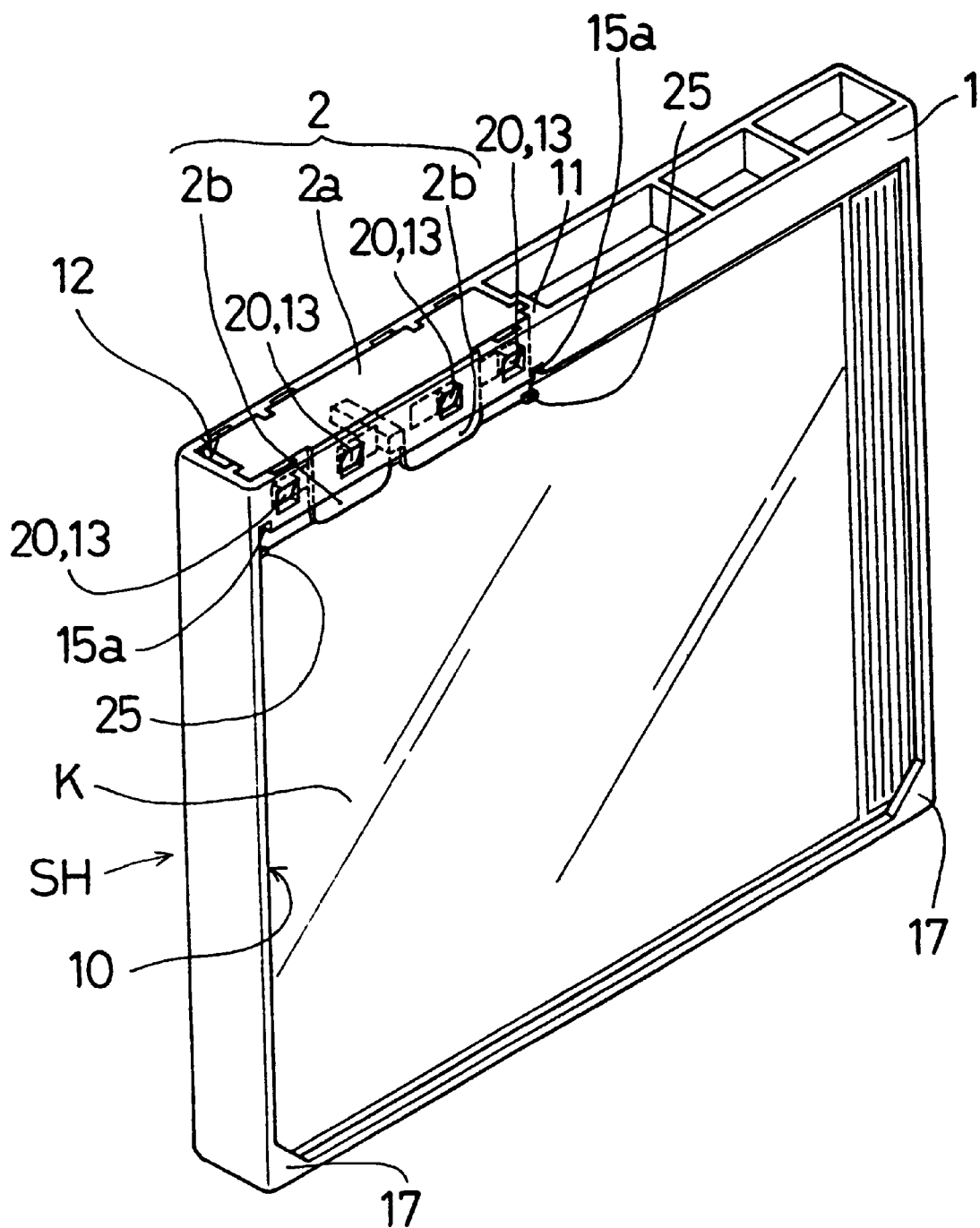
FIG. 1 is a perspective view of an embodiment of a holder for a recorded media container of the present invention, the holder holding the recorded media container therein.

FIG. 1 shows a holder SH for a recorded media container K of the present invention, and the container K is held in this holder SH.

Figure 2:
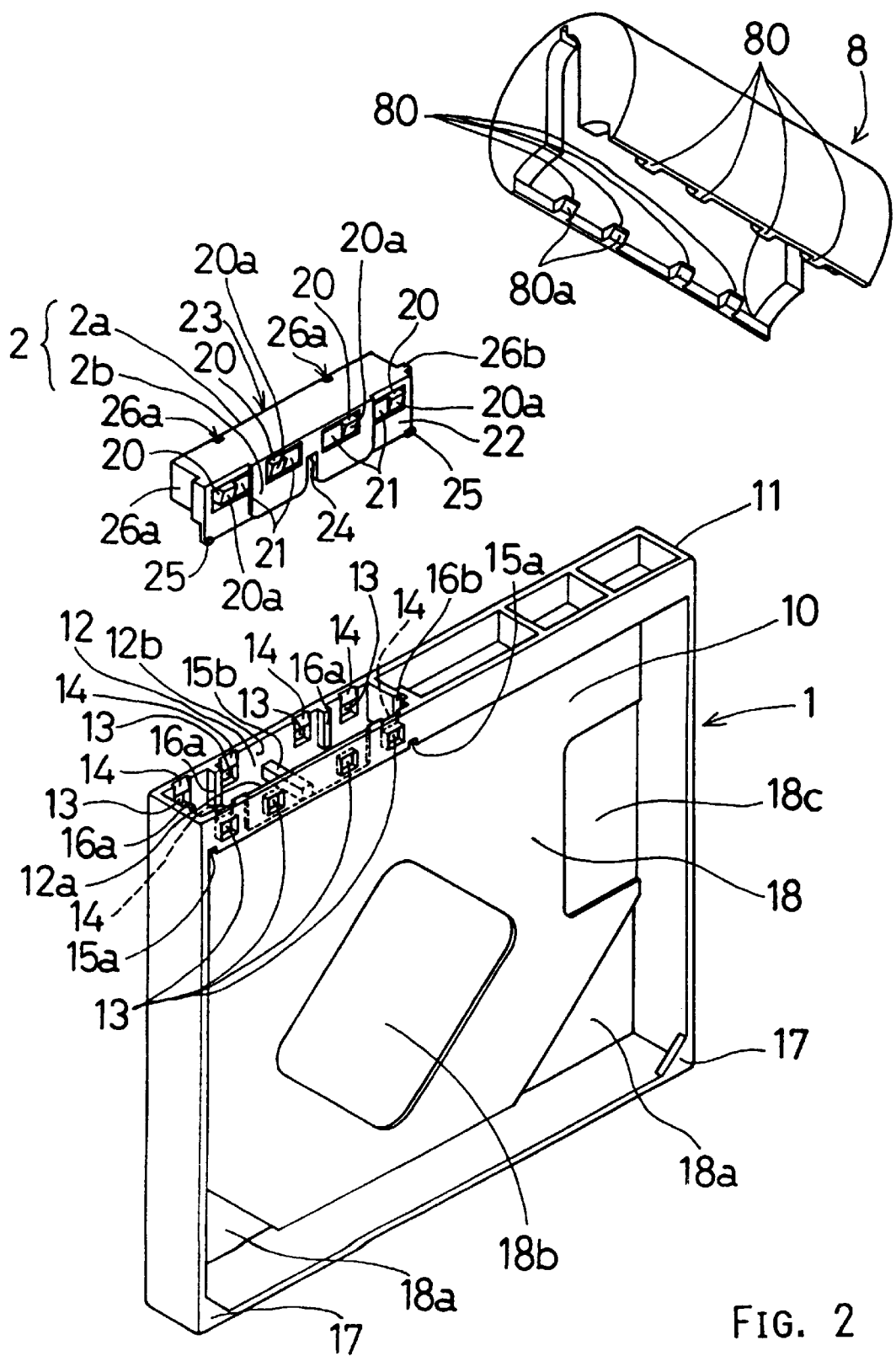
FIG. 2 is a front perspective view of a holder main body of the holder of FIG. 1, a locking means and a lock releasing means being also shown therein.
Figure 5:
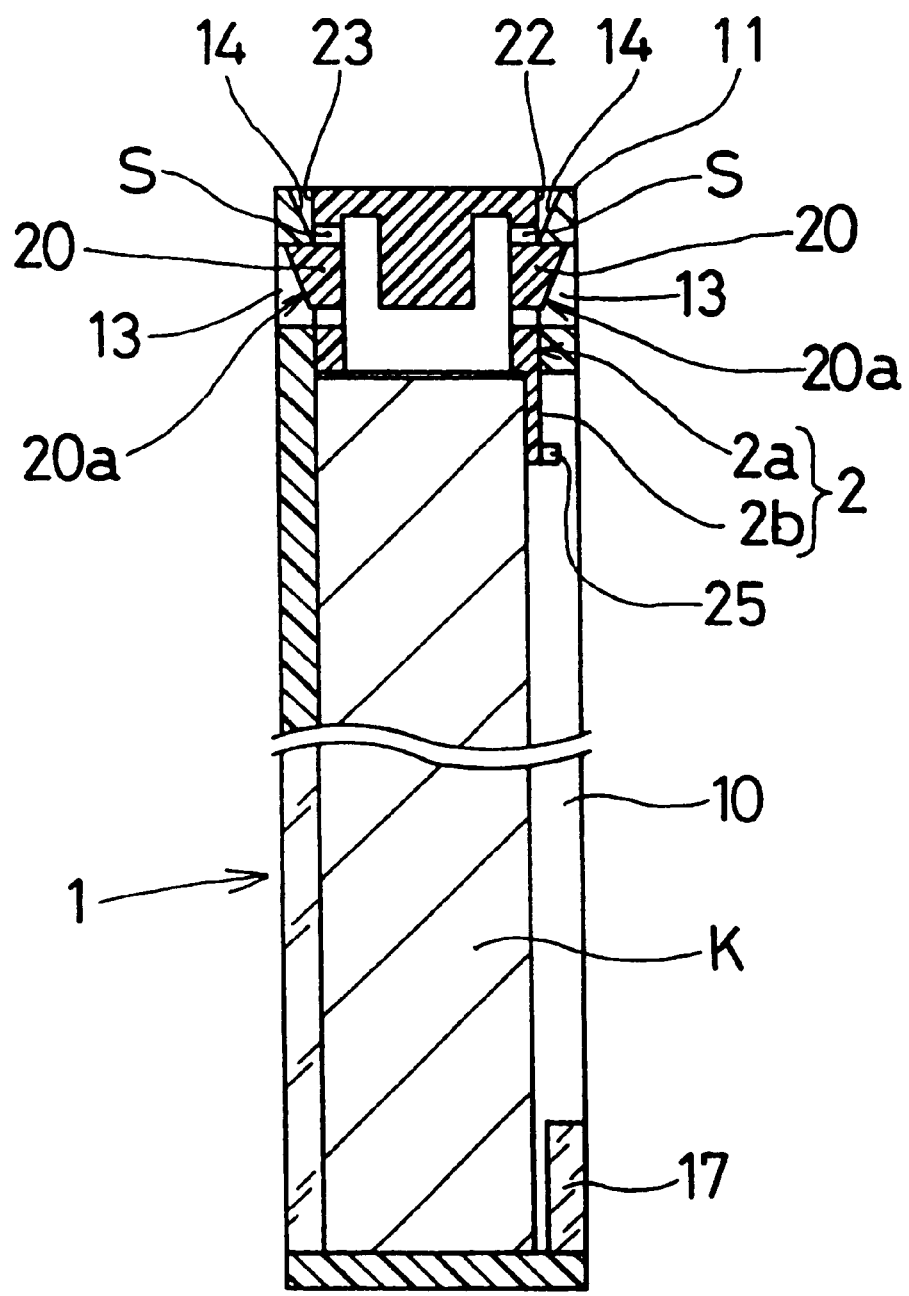
FIG. 5 is a longitudinal sectional view of the holder of FIG. 1.
Figure 6:
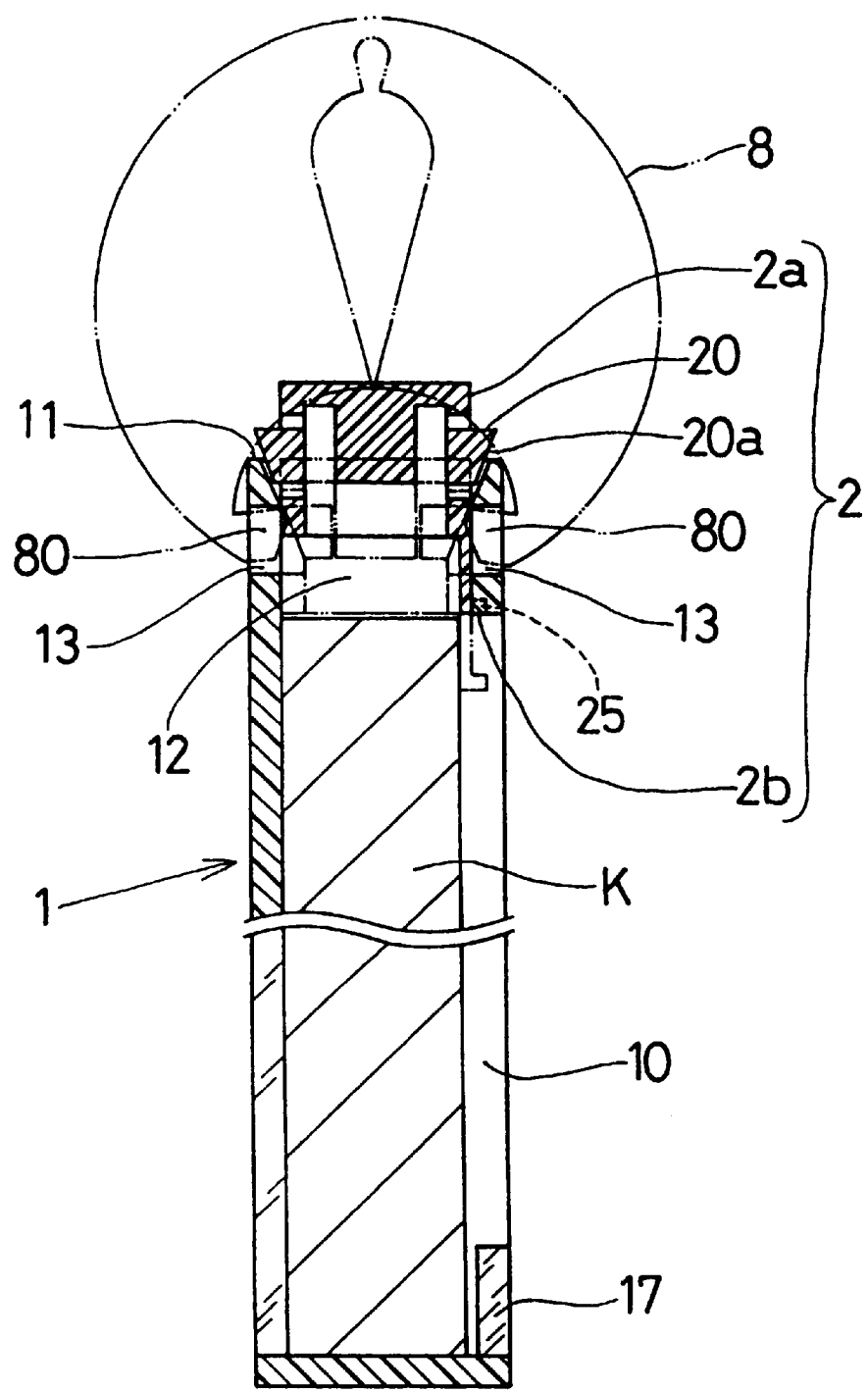
FIG. 6 is a longitudinal sectional view of the holder main body of FIG. 5 with the lock releasing means releasing the locking means from the holder main body.
Figure 7:
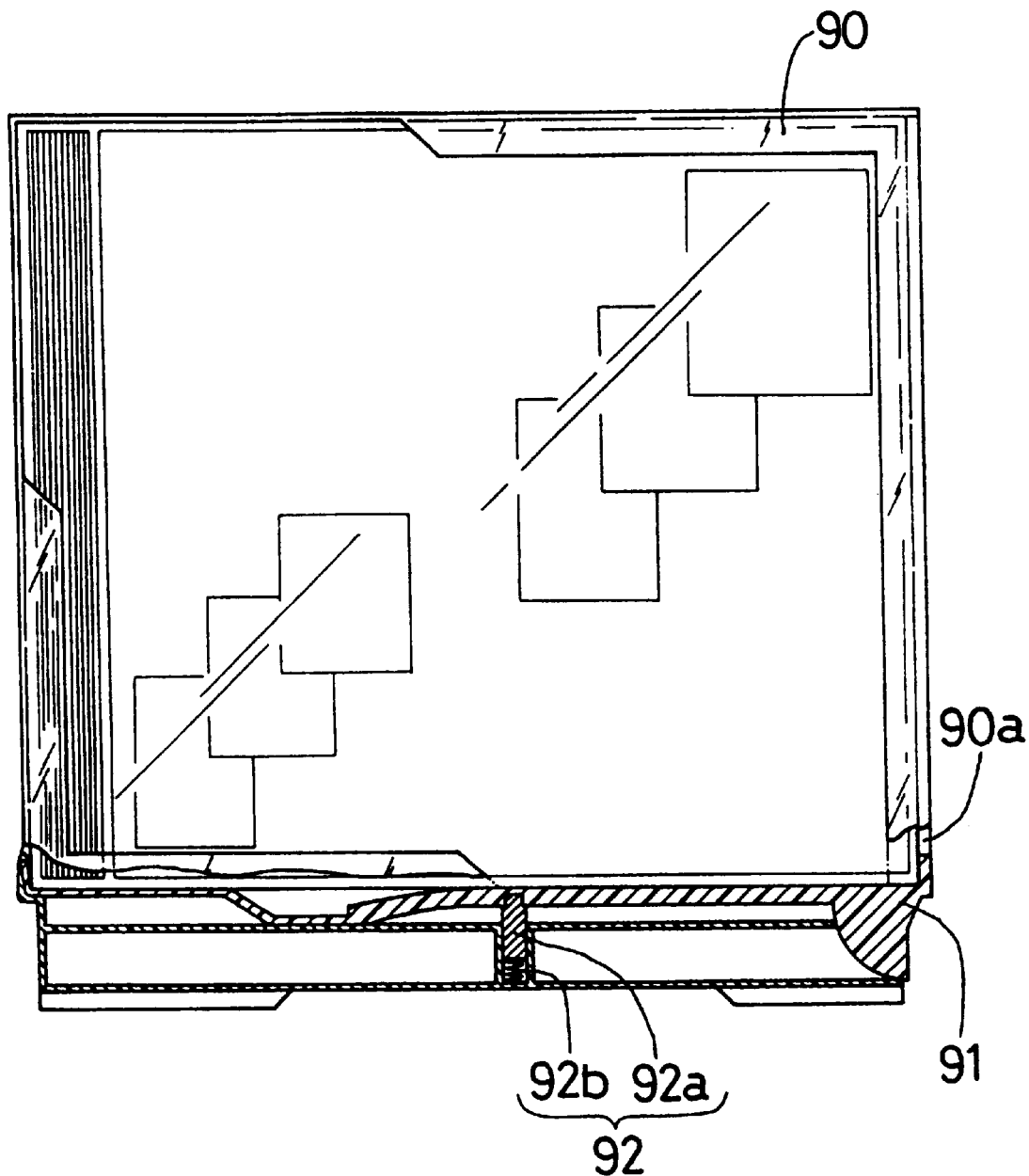
FIG. 7 is a partially sectional view of a conventional holder for a recorded media container.
Figure 8:
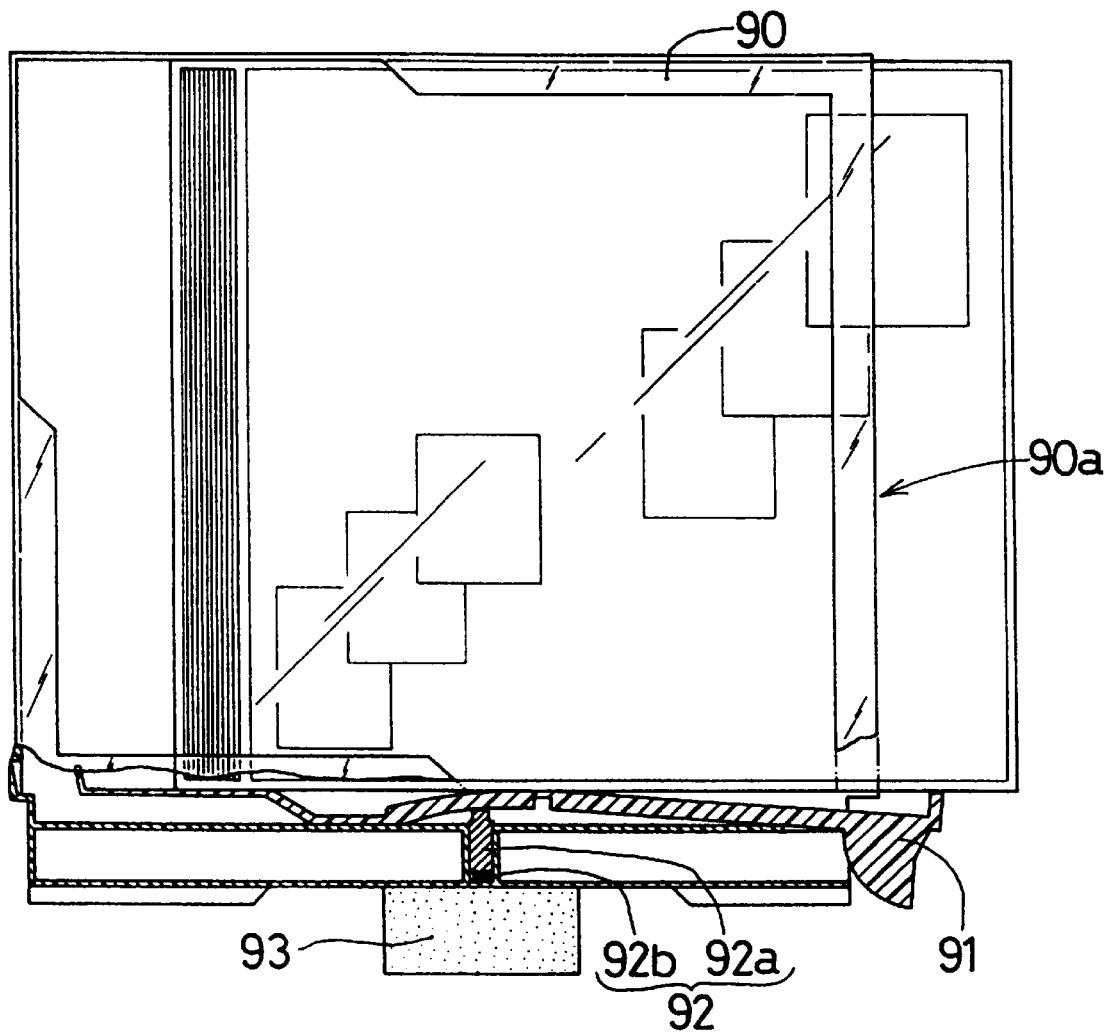
FIG. 8. is a partially sectional view of the conventional holder of FIG. 7, wherein a lock mechanism of the holder is released.

The holder SH, as shown in FIGS. 1 and 2, comprises a holder main body 1, and a locking means 2 releasably engaged with one of the peripheral sides 11 of the holder main body 1. The locking means 2 is released from the holder main body 1 by a lock releasing means 8 shown in FIG. 2. Before being released, the locking means 2 is in the inserted state as shown in FIG. 5; and after being released, the locking means 2 projects out, as shown in FIG. 6, so that the container K held in the holder main body 1 can be taken out of the holder main body 1.

The structure of each member of the holder for a recorded media container of the present invention will be described in detail below.

Holder Main Body

The holder main body 1 is made of a synthetic resin and as shown in FIGS. 1 and 2 formed into a shape corresponding to the shape of the recorded media container K. The holder main body 1 has an open area 10 on the front side thereof for receiving and releasing the container K.

The peripheral part above the open area 10 is formed higher so as to form an engagement section 12 in which the locking means 2 is inserted and engaged with the peripheral side 11. As seen from FIG. 2, four through holes 13 are formed on each the front side 12a and the rear side 12b of the engagement section 12; and a slope 14 is formed on one of the surfaces that form each one of the through holes 13.

Guide pieces 16a and guide groove 16b are provided on the inner side of the engagement section 12, as shown in FIG. 2, so as to guide the locking means 2 to be inserted into and disengaged from the engagement section 12. Concavities 15a are provided on the holder main body 1 for preventing the locking means 2 from slipping out of the holder main body 1, and a stop piece 15b is provided for preventing the locking means 2 from being inserted more deeply into the engagement section 12 than necessary.

As shown in FIG. 2, the holder main body 1 further includes: at least one small stopper means 17 provided in the lower corner of the open area 10 so as to cover part of the open area 10, triangular holes 18a provided on a rear plate 18 so as to confront the stopper means 17, a hole 18b provided in the center of the rear plate 18 in order to facilitate the removal of the container K, and an attachment portion 18c (formed thinner in plate thickness) for sticking thereon a theft detection tag on which a bar code is printed.

Locking Means

Figure 3:
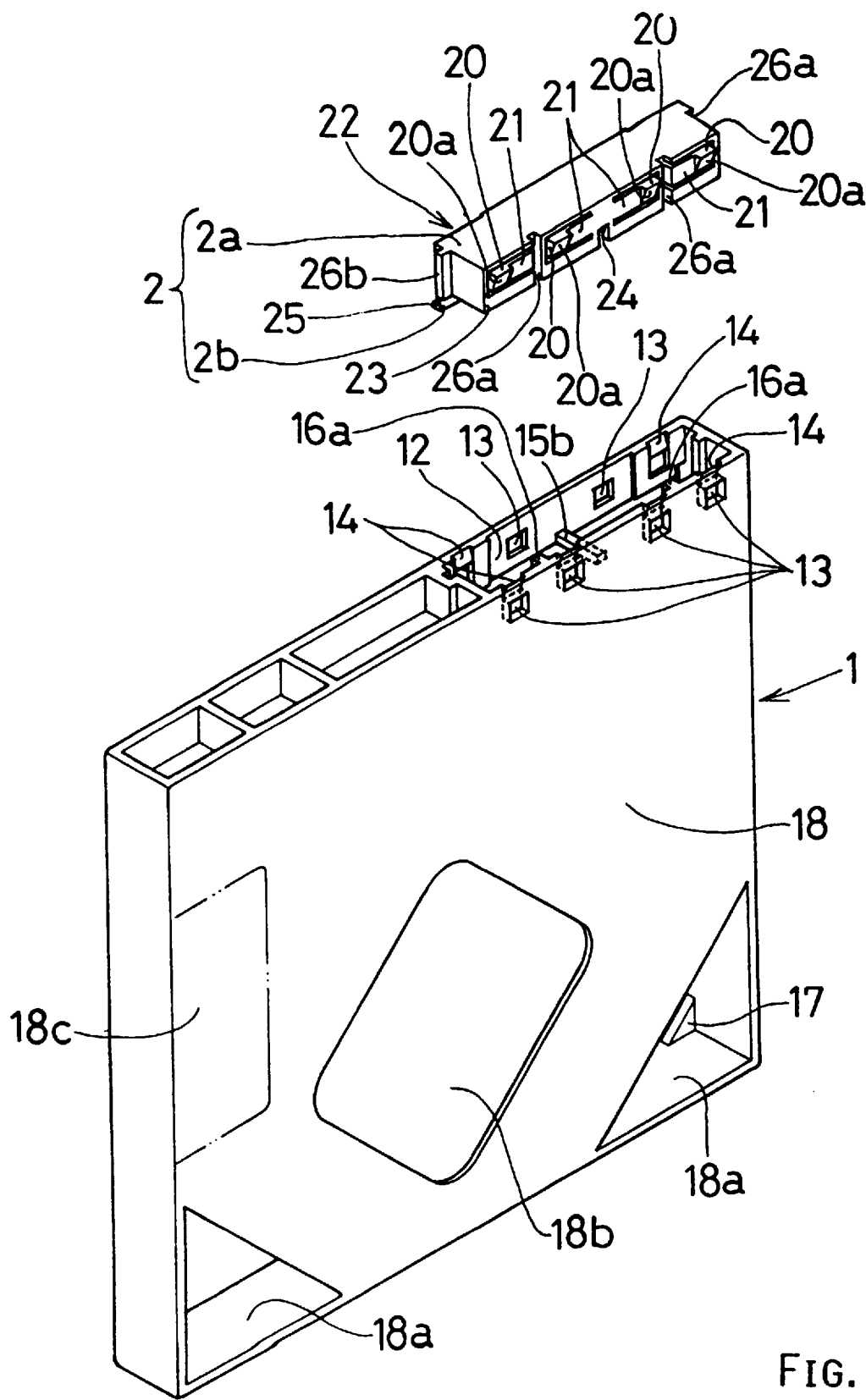
FIG. 3 is a rear perspective view of the holder main body of the holder of FIG. 1, with only the locking means being shown therein.
Figure 4:
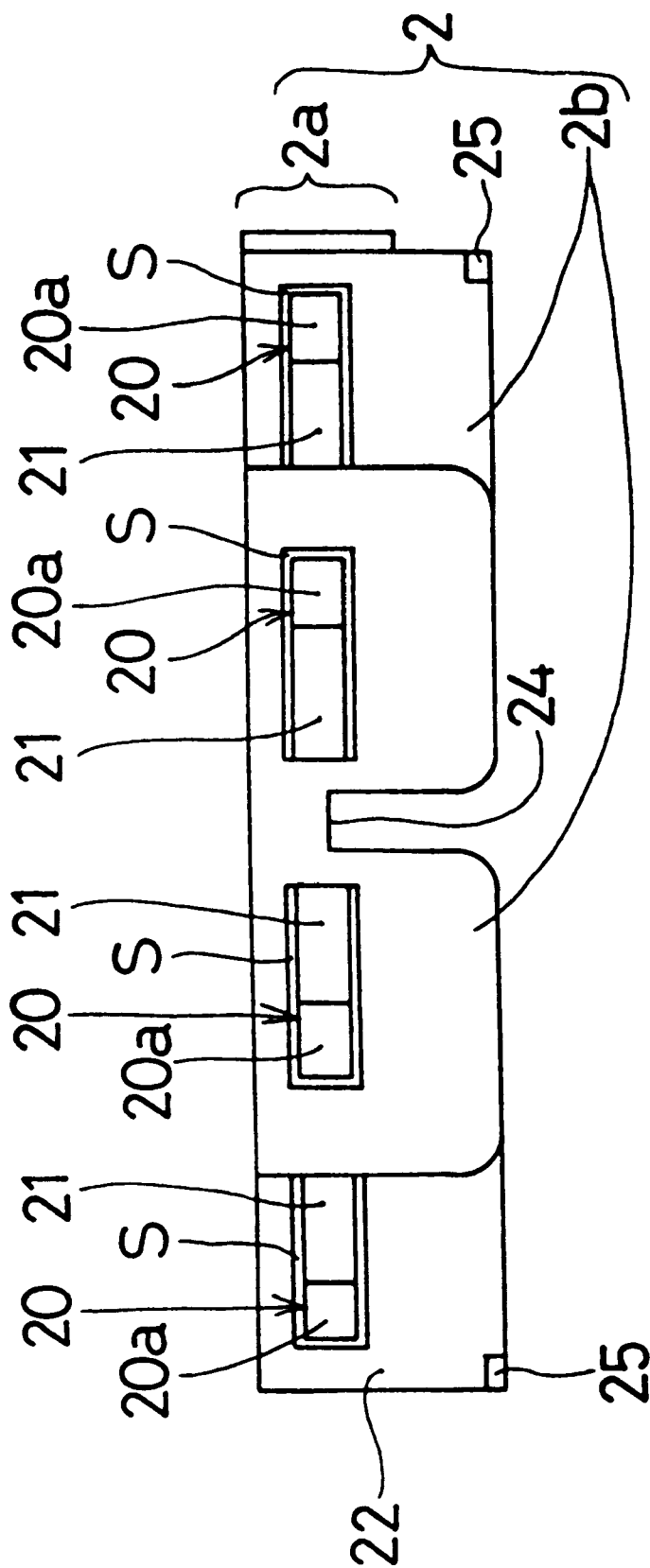
FIG. 4 is a front view of the locking means.

The locking means 2 is made of a synthetic resin, and as shown in FIGS. 2 to 6 it comprises a rectangular parallelepiped body 2a having an opening at the bottom and a pair of cover plates 2b extending below the front surface 22 of the parallelepiped body 2a. As shown in FIGS. 2 to 4, angled C-shaped slits S and angled reversed C-shaped shaped slits S are respectively opened on the front surface 22 and the rear surface 23 of the parallelepiped body 2a, thus forming elastically bendable cantilever-type tongues 21. Pawls 20 are formed at the free ends of the tongues 21 so that the pawls 20 symmetrically correspond in pairs on each the front surface 22 and the rear surface 23 of the parallelepiped body 2a. As best seen from FIG. 5, the pawls 20 project out of the front and rear surfaces 22 and 23; and when pressed, the pawls 20 sink into the front and rear surfaces 22 and 23. As shown in FIG. 5, each of the pawls 20 is provided with a slope 20a so that the upper side of the pawl 20 projects from the front surface 22 or the rear surface 23, and the bottom side of the pawl 20 is almost flush with the front surface 22 or the rear surface 23.

As shown in FIGS. 2 and 3, guide grooves 26a and guide piece 26b are formed on the outer surface of the locking means 2 so as to respectively engage with the guide pieces 16a and the guide groove 16b of the holder main body 1.

As shown in FIGS. 2 and 4, on the front surface 22 of the locking means 2, a recess 24 is formed between the cover plates 2b; and as shown in FIG. 3, on the rear surface 23 of the locking means 2, a recess 24 is formed at a position that corresponds to the recess 24 of the front surface 22. These recesses 24 come into contact with the stop piece 15b of the holder main body 1 so as to prevent the locking means 2 from being inserted more deeply into the engagement section 12 than necessary. As shown in FIGS. 1 and 4, protrusions 25 are formed at the ends of the cover plates 2b of the locking means 2. The protrusions 25 come into contact with the concavities 15a of the holder main body 1 so as to prevent the locking means 2 from slipping out apart from the holder main body 1.

Lock Releasing Means

As shown in FIG. 2, the lock releasing means 8 is formed by axially cutting out the bottom part of a cylindrical body; and on the cutout edges of the lock releasing means 8, a plurality of projections 80 (having slopes 80a at the tips) are provided at positions corresponding to the through holes 13 of the holder main body 1. The confronting projections 80 of this lock releasing means 8 are designed so as to come closer to each other when the lock releasing means 8 is gripped and pressed diametrically and apart from each other by an elastic restoring force when the gripping force is removed from the lock releasing means 8. As illustrated by the two-dot chain line in FIG. 6, the projections 80 simultaneously press the slopes 20a of the pawls 20 of the locking means 2 in the state shown in FIG. 5. Thus, when pressed, the slopes 20a of the pawls 20 slide over the projections 80 of the lock releasing means 8 and over the slopes 14 of the through holes 13 thanks to the elastic restoring force of the tongues 21 (which is, as described above, made of synthetic resin), so that the locking means 2 pops out of the engagement section 12 and released as shown in FIG. 6.

Since the lock releasing means 8 is not a magnet of an easily available simple shape but is complicated in shape and designed to press the plurality (eight in this embodiment) pawls 20 simultaneously, a person other than a shop clerk who has the lock releasing means 8 cannot unlock the holder SH. Thus, a theft can be effectively prevented by the use of the holder of the present invention together with the conventional detection gate system.

Although the open area 10 is formed on the front side of the holder main body 1 in the above embodiment, it is not limited to be formed on the front side. The open area 10 may be formed on one of the peripheral sides of the holder main body 1 so that the cover plates 2b of the locking means 2 covers (part of) the open area 10 formed on the peripheral side.

Moreover, the number of pawls 20 is not limited to eight.

As seen from the above, the holder for a recorded media container of the present invention can hold the container of a compact disk, a video tape, a cassette tape, a game cassette or the like, on which music, movies, game programs or the like are already recorded.

Figure 9:
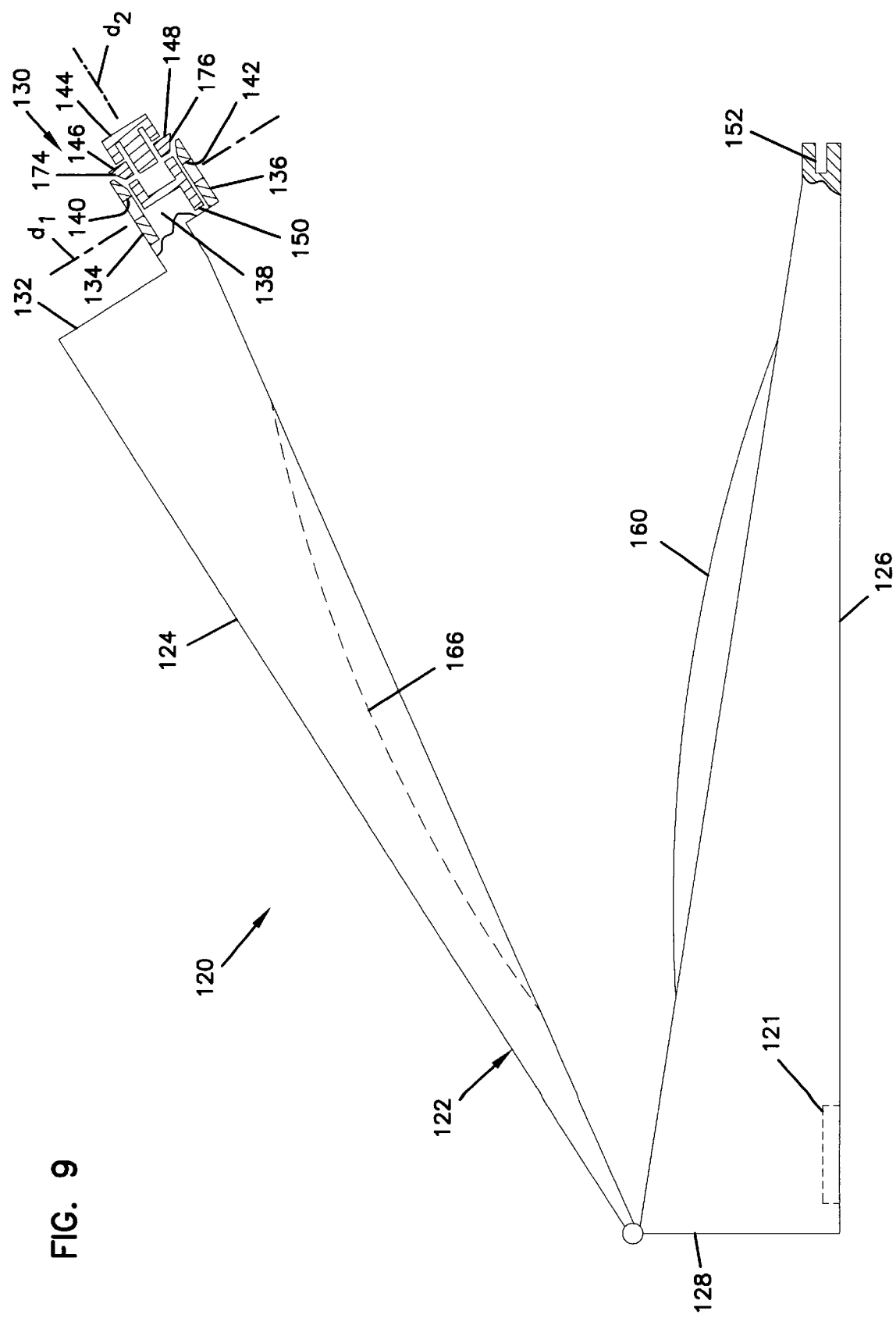
FIG. 9 shows another security case constructed in accordance with the principles of the present invention, the security case is shown in a partially open orientation.

FIG. 9 illustrates another security case 120 constructed in accordance with the principles of the present invention. The security case 120 defines a generally rectangular interior volume sized for holding or storing merchandise such as cigarette cartons, T-shirts, toys, jewelry, video games, video or cassette tapes, video disks, compact disks, etc. Preferably, a conventional theft detection tag 121 is attached to an inner surface of the security case 120. If a person attempts to steal merchandise contained within the security case 120 without removing the merchandise from the security case 120, the theft detection tag 121 will be detected when the person passes through a detection gate (not shown) installed at the exit of the store where the merchandise is being sold.

The security case 120 includes a housing 122 having a top piece 124 and a bottom piece 126. The top and bottom pieces 124 and 126 are pivotally connected to one another at a first end 128 of the housing 122. The pivotal connection allows the top and bottom pieces 124 and 126 to be pivoted between an open orientation (a partially open orientation is shown in FIG. 9) and a closed position (shown in FIG. 10). A locking mechanism 130 is positioned at a second end 132 of the housing 122. The locking mechanism 130 is adapted for locking the top and bottom pieces 124 and 126 in the closed orientation.

The locking mechanism 130 includes top and bottom walls 134 and 136 that project outward from the top piece 124. A space 138 is defined between the top and bottom walls 134 and 136. A plurality of top through-holes 140 (only one shown in FIGS. 9–11) are defined through the top wall 134. Similarly, a plurality of bottom through-holes 142 (only one shown in FIGS. 9–11) are defined through the bottom wall 136. The top and bottom through-holes 140 and 142 extend through their corresponding walls 134 and 136 along a spacial dimension $d_1$.

The locking mechanism 130 also includes a locking member 144 mounted within the space 138 between the top and bottom walls 134 and 136. Preferably, the locking member 144 has a configuration substantially similar to the locking member 2 of FIGS. 1–6. The locking member 144 is preferably movable along a second spacial dimension $d_2$ between a locked position (shown in FIG. 11) in which the top and bottom housing pieces 124 and 126 are locked in the closed position, and an unlocked position (shown in FIG. 10) in which the top and bottom housing pieces 124 and 126 can be pivoted from the closed position to the open position. The second spacial dimension $d_2$ is generally transversely aligned relative to the first spacial dimension $d_1$.

Figure 10:
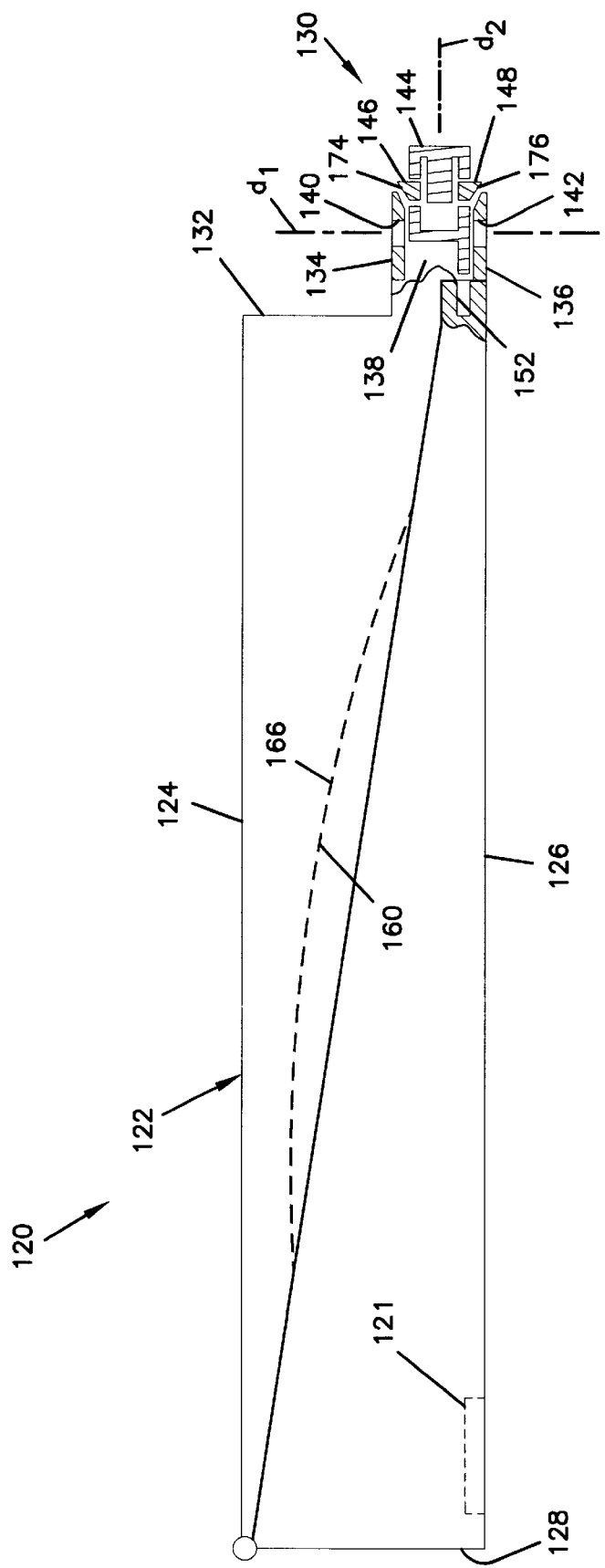
FIG. 10 shows the security case of FIG. 9 in a closed, but unlocked orientation.
Figure 11:
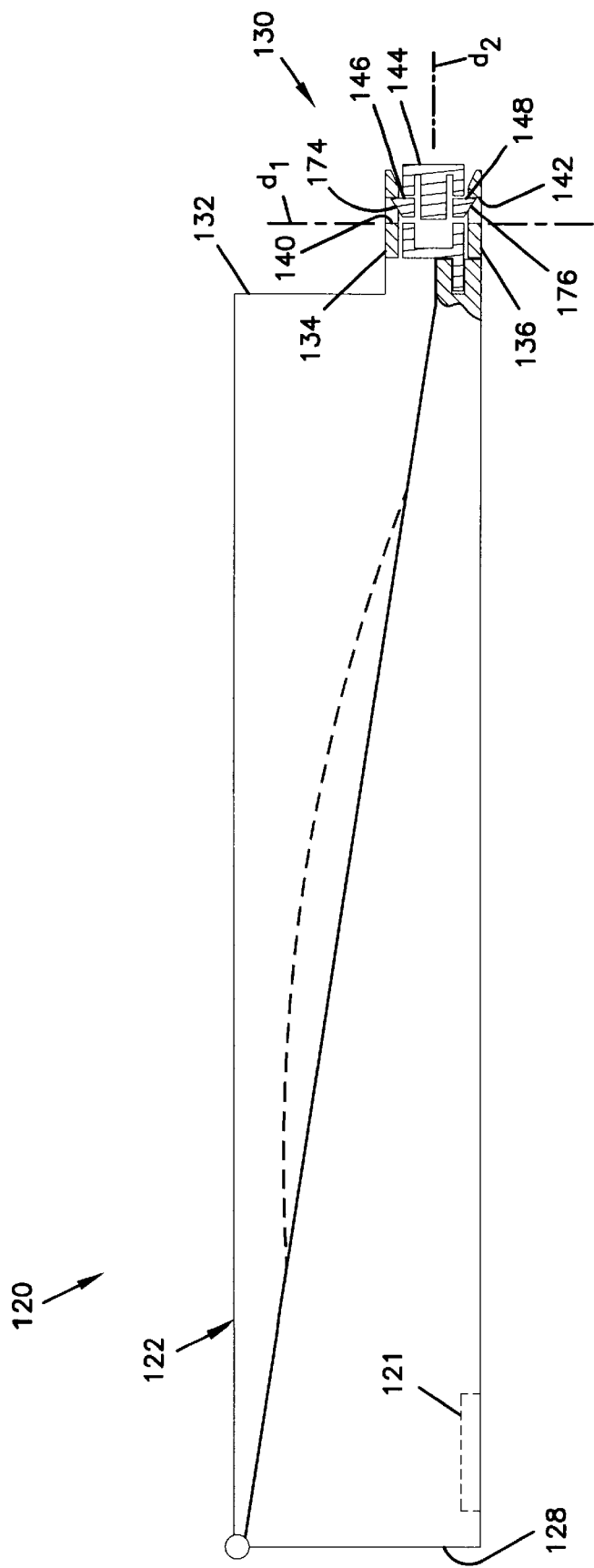
FIG. 11 shows the security case of FIG. 9 in a closed and locked orientation.

The locking member 144 includes a plurality of top retaining members 146 (only one is shown in FIGS. 9–11) for retaining the locking member 144 in the locked position of FIG. 11. The top retaining members 146 are arranged and configured to resiliently move into the top through-holes 140 when the locking member 144 is moved to the locked position of FIG. 11. Preferably, the top retaining members 146 comprise tabs mounted at the end resilient cantilever members as shown in the embodiment of FIGS. 1–6.

The locking member 144 also includes a plurality of bottom retaining members 148 (only one of which is shown in FIGS. 9–11) for retaining the locking member 144 in the locked position of FIG. 11. The bottom retaining members 148 are arranged and configured to resiliently move into the bottom through-holes 142 when the locking member is moved to the locked position of FIG. 11. Preferably, the bottom retaining members 148 comprise tabs formed on resilient cantilever members as shown in the embodiment of FIGS. 1–6.

Similar to the locking member of the embodiment of FIGS. 1–6, the locking member 144 includes two locking tabs 150 (only one shown in FIGS. 9–11) that extend outward from the locking member in a direction generally along the second spacial dimension $d_2$. The locking tabs 150 cooperate with locking surfaces 152 (two of which are shown in FIG. 14) to lock the top and bottom pieces 124 and 126 of the housing 122 in the closed orientation. The locking surfaces 152 are positioned such that when the locking member 144 is moved to the locking positioned (shown in FIG. 11) while the top and bottom pieces 124 and 126 are in the closed orientation, the locking tabs 150 and the locking surfaces 152 over lap one another. Because the locking tabs 150 and the locking surfaces 152 over-lap one another, contact between the locking tabs 150 and the locking surfaces 152 prevents the top and bottom pieces 124 and 126 of the housing 122 from being pivoted from the closed orientation to the open orientation.

Figure 15:
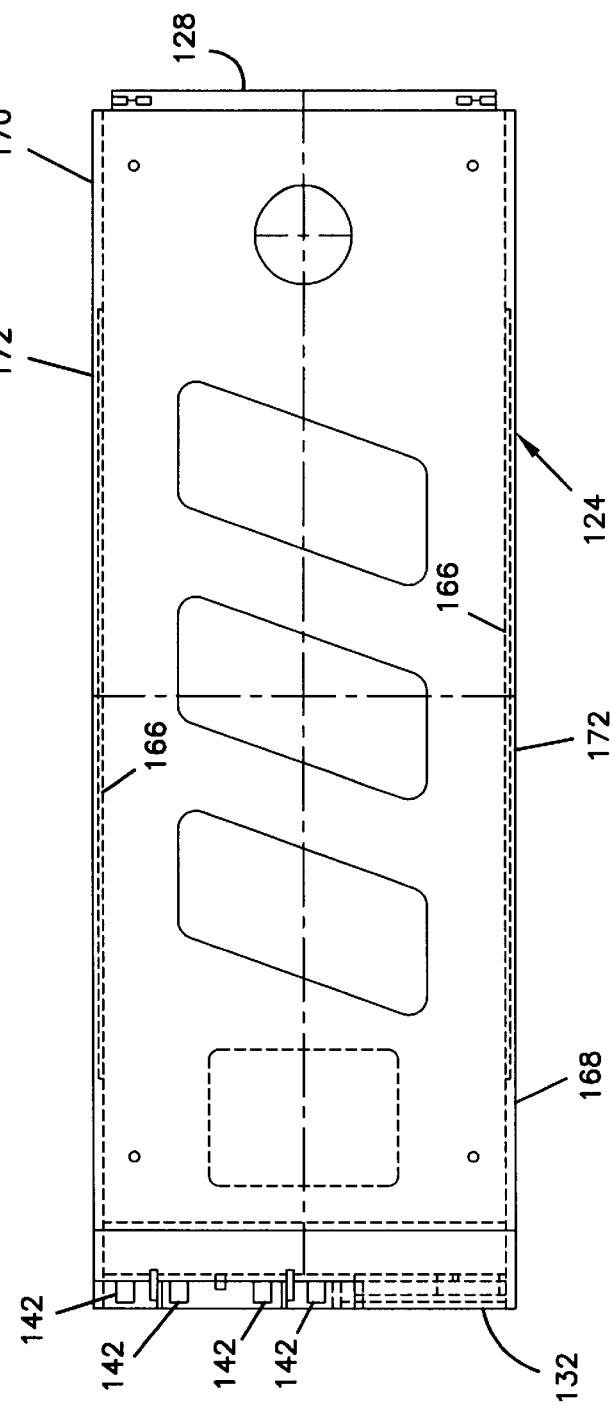
FIG. 15 is a bottom, plan view of the upper housing piece of the security case of FIG. 9.
Figure 17:
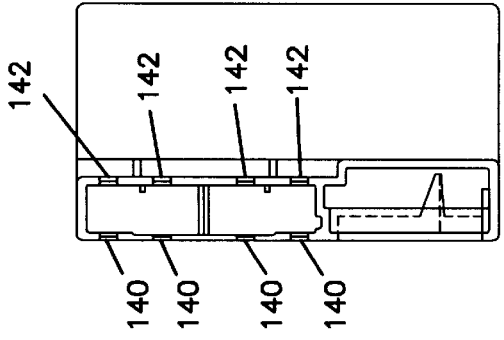
FIG. 17 is an end, elevational view of the housing piece of FIG. 15.

Referring to FIGS. 12 and 14, the locking surfaces 152 at least partially define recesses 154 sized for receiving the locking tabs 150. Also, referring to FIGS. 15 and 17, the positioning of the top and bottom through-holes 140 and 142, as well as the configuration of the space 138, are illustrated.

Referring to FIGS. 12–14, the housing 122 includes opposing sides 156 and 158 that extend between the first and second ends 128 and 132 of the housing 122. As shown in FIGS. 12–14, the bottom piece 126 includes projections 160 located at the sides 156 and 158 of the housing 122. The projections 160 project upward from sidewalls 162 and 164 of the bottom piece 126. The projections 160 extend along top edges of the sidewalls 162 and 164 and have upper surfaces that are generally curved. As best shown in FIG. 12, the projections 160 are formed along inside edges of the sidewalls 162 and 164.

Figure 16:
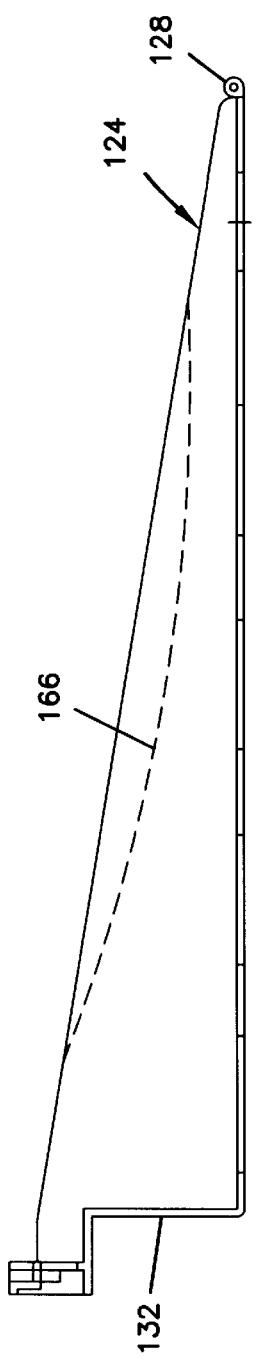
FIG. 16 is a side, elevational view of the housing piece of FIG. 15.

The projections 160 are configured to be received in complimentary recesses 166 (shown in FIGS. 15 and 16) of the top piece 124 when the top and bottom pieces 124 and 126 are pivoted to the closed position. The recesses 166 are formed along top edges of sidewalls 168 and 170 of the top piece 124. Preferably, the recesses 166 are located inside lateral retaining portions 172 (shown in FIG. 15) of the sidewalls 168 and 170. When the top and bottom pieces 124 and 126 are pivoted closed, the projections 160 fit within the recesses 166. In such a closed position, contact between the projections 160 and the lateral retaining portions 172 restricts relative movement between the top and bottom pieces 124 and 126 in a lateral direction (i.e., a direction generally parallel to the pivot access of the housing 122).

Referring back to FIG. 11, the top retaining members 146 include top ramped surfaces 174 that face outward from or through the top through-holes 140 when the locking member 144 is in the locked position of FIG. 11. Similarly, the bottom retaining members 148 include bottom ramped surfaces 176 that face outward or through the bottom through-holes 142 when the locking member 144 is in the locked position of FIG. 11. The top and bottom retaining members 146 and 148 are displaced from their corresponding top and bottom through-holes 140 and 142 by concurrently pressing the top and bottom ramped surfaces 174 and 176 inward along the spacial dimension $d_1$. The ramped surfaces 174 and 176 are angled such that when the ramped surfaces 174 and 176 are pressed inward along the spacial dimension $d_1$, the locking member 144 is caused to move along the second dimension $d_2$ from the locked position of FIG. 11 toward the unlocked position of FIG. 10. For example, the top and bottom ramped surfaces 174 and 176 are aligned at an oblique angles with respect to the spacial dimension $d_1$ such that when the ramped surfaces 174 and 176 are pressed inward along the spacial dimension $d_1$, a component of the pressing force pushes the retaining members 146 and 148 along the second spacial dimension $d_2$ in a direction extending from the locked position toward the unlocked position. Thus, after the retaining members 146 and 148 are completely depressed from the through-holes 140 and 142, the force along dimension $d_2$ causes the locking member 144 to slide toward the unlocked position.

The locking mechanism 130 used by the housing 122 can be unlocked using the same tool 8 used to unlock the security case of FIGS. 1–6. To unlock the locking mechanism 130, the jaws of the tool 8 are positioned above and below the top and bottom walls 134 and 136 of the locking mechanism. Next, top and bottom unlocking projections 80 of the tool 8 are aligned with the top and bottom through-holes 140 and 142 defined through the top and bottom walls 134 and 136. Thereafter, the jaws of the tool 8 are clamped together. As the jaws are clamped together, the unlocking members 80 of the tool 8 press the top and bottom retaining members 146 and 148 inward thereby displacing them from their corresponding through-holes 140 and 142. The unlocking members 80 of the tool 8 include ramped surfaces 8*a* that cooperate with the ramped surfaces 174 and 176 of the retaining members 146 and 148 to push the locking member 144 from the locked position toward the unlocked position. Therefore, in a single clamping stroke of the tool 80, the top and bottom retaining members 146 and 148 are first displaced from their corresponding top and bottom through-holes 140 and 142, and then second, the locking member 142 is automatically pushed from the locked position of FIG. 11 to the unlocked position of FIG. 10.

In use of the security case 120, merchandise desired to be protected is stored within the housing 122. With the merchandise stored within the housing 122, the locking mechanism 130 is locked and the housing 122 is placed on display. If a customer wants to purchase the merchandise stored within the security case 120, the customer brings the security case 120 to a store representative. After the customer has paid for the merchandise, the store representative uses the tool 8 or a similar tool to unlock the locking mechanism 130 and remove the merchandise from the security case 120. The customer can then exit the store with the merchandise without causing a detection gate positioned at the store exit to generate an alarm signal. If a shoplifter attempts to steal merchandise without removing the merchandise from the security case 120, the theft detection tag 121 held within the security case 120 is detected by the detection gate and an alarm signal is generated. In this manner, store personnel are provided with notification that a theft is occurring.

With regard to the forgoing description, it is to be understood that changes can be made in detail, especially in matters of the construction materials employed and the shape, size and arrangement of these parts without departing from the scope of the present invention. It is intended that the specification and depicted embodiments be considered exemplary only, with a true scope and spirit of the invention being indicated by the broad meaning of the following claims.

What is claimed is:

1. A security system for securing an object, the system comprising:

a housing defining a region for storing the object, the housing including a wall defining a plurality of through-holes;

a locking member mounted along the wall, the locking member being moveable between a locked position and an unlocked position;

retaining members connected to the locking member for retaining the locking member in the locked position, the retaining members being arranged and configured to resiliently move into the through-holes when the locking member is moved to the locked position;

an unlocking tool including unlocking members arranged and configured to fit within the through-holes, wherein the retaining members are displaced from the through-holes by pressing the unlocking members into the through-holes such that the retaining members are pressed out of the through-holes; and means for automatically moving the locking member from the locked position toward the unlocked position after the retaining members have been displaced from the through-holes.

2. A security system for securing an object, the system comprising:

a housing defining a region for storing the object, the housing including a wall defining a plurality of through-holes;

a locking member mounted along the wall, the locking member being moveable between a locked position and an unlocked position;

retaining members connected to the locking member for retaining the locking member in the locked position, the retaining members being arranged and configured to resiliently move into the through-holes when the locking member is moved to the locked position;

an unlocking tool including unlocking members arranged and configured to fit within the through-holes, wherein the retaining members are displaced from the through-holes by pressing the unlocking members into the through-holes such that the retaining members are pressed out of the through-holes; and at least one of the unlocking members and the retaining members includes ramped surfaces arranged and configured to cause the locking member to move from the locked position toward the unlocked position after the retaining members have been displaced from the through-holes.

3. A security system for securing an object, the system comprising:

a case defining a region for storing the object, the case including first and second opposing walls separated by a space, the first wall defining a plurality of first through-holes and the second wall defining a plurality of second through-holes;

a locking member mounted within the space between the first and second walls, the locking member being moveable between a locked position in which the object is prevented from being removed from the case, and an unlocked position in which the object can be inserted into or removed from the case;

first retaining members connected to the locking member for retaining the locking member in the locked position, the first retaining members being arranged and configured to resiliently move into the first through-holes when the locking member is moved to the locked position;

second retaining members connected to the locking member for retaining the locking member in the locked position, the second retaining members being arranged and configured to resiliently move into the second through-holes when the locking member is moved to the locked position; and an unlocking tool including opposing first and second jaws, the first jaw including first unlocking members arranged and configured to fit within the first through-holes, the second jaw including second unlocking members arranged and configured to fit within the second through holes, wherein the first and second retaining members are displaced from their corresponding first and second through-holes by positioning the case between the first and second locking jaws, aligning the first unlocking members with the first through-holes and the second unlocking members with the second through-holes, and pressing the first and second jaws together such that the first and second locking members displace the first and second retaining members from their corresponding first and second through-holes.

4. The security system of claim 3, wherein the unlocking members include inclined surfaces arranged and configured for moving the locking member from the locked position toward the unlocked position.

5. The security system of claim 3, wherein the retaining members include inclined surfaces arranged and configured for causing the locking member to be moved from the locked position toward the unlocked position by the unlocking members.

6. The security system of claim 3, wherein the retaining members and the unlocking members include inclined surfaces that cooperate to move the locking member from the locked position toward the unlocked position after the resilient retaining members have been displaced from the first and second through-holes.

7. The security system of claim 3, further comprising means for automatically moving the locking member from the locked position toward the unlocked position after the first and second retaining members have been displaced from their corresponding first and second through-holes.

8. An anti-theft storage case comprising:
a housing defining a region for storing an object, the housing including a first wall defining a plurality of first through-holes that extend along a first dimension through the first wall;
a locking member mounted along the first wall, the locking member being moveable along a second dimension between a locked position in which the object is prevented from being removed from the housing, and an unlocked position in which the object can be inserted into or removed from the housing, the second dimension being generally transversely aligned relative to the first dimension;
first retaining members connected to the locking member for retaining the locking member in the locked position, the first retaining members being arranged and configured to resiliently move into the first through-holes when the locking member is moved to the locked position; and
the first retaining members including first ramped surfaces that face outward from the first through-holes when the locking member is in the locked position such that the first retaining members can be displaced from the first through-holes by pressing the first ramped surfaces along the first dimension, the first ramped surfaces being angled such that when the first ramped surfaces are pressed along the first dimension, the locking member is caused to move along the second dimension from the locked position toward the unlocked position.

9. The anti-theft storage case of claim 1, wherein the housing includes a second wall spaced from the first wall that defines a plurality of second through-holes that extend along the first dimension through the second wall, wherein the locking member is mounted between the first and second walls, and wherein the case further comprises second retaining members connected to the locking member for retaining the locking member in the locked position, the second retaining members being arranged and configured to resiliently move into the second through-holes when the locking member is moved to the locked position, the second retaining members including second ramped surfaces that face outward from the second through-holes when the locking member is in the locked position such that the second retaining members can be displaced from the second through-holes by pressing the second ramped surfaces along the first dimension, the second ramped surfaces being angled such that when the second ramped surfaces are pressed along the first dimension, the locking member is caused to move along the second dimension from the locked position toward the unlocked position.

10. The anti-theft storage case of claim 8, wherein the housing includes a first piece pivotally connected to a second piece, the first and second pieces being pivotally moveable between an open position and a closed position.

11. The anti-theft storage case of claim 10, wherein the locking member is adapted to lock the first and second pieces in the closed position when the locking member is in the locked position.

12. An anti-theft storage case comprising:
a housing defining a region for storing an object, the housing including a first piece pivotally connected to a second piece, the first and second pieces being moveable between an open position in which the object can be inserted into or removed from the housing, and a closed position;
the first piece of the housing including first and second opposing walls separated by a space, the first wall defining a plurality of first through-holes and the second wall defining a plurality of second through-holes, the first and second through-holes extending along a first dimension respectively through the first and second walls;
a locking member mounted within the space between the first and second walls, the locking member being moveable along a second dimension between a locked position in which the first and second pieces of the housing are locked in the closed position, and an unlocked position in which the first and second pieces of the housing can be pivoted from the closed position to the open position, the second dimension being generally transverse with respect to the first dimension;
first retaining members connected to the locking member for retaining the locking member in the locked position, the first retaining members being arranged and configured to resiliently move into the first through-holes when the locking member is moved to the locked position;
second retaining members connected to the locking member for retaining the locking member in the locked position, the second retaining members being arranged and configured to resiliently move into the second through-holes when the locking member is moved to the locked position;
a locking tab that extends outward from the locking member in a direction generally along the second dimension; and
a locking surface formed on the second piece of the housing, the locking surface being positioned such that when the locking member is moved to the locking position while the first and second pieces of the housing are in the closed position, the locking tab and the locking surface overlap one another, wherein contact between the locking tab and the locking surface prevents the first and second pieces of the housing from being pivoted from the closed position to the open position.

13. The anti-theft storage case of claim 12, wherein the locking surface at least partially defines a recess for receiving the locking tab.

14. The anti-theft storage case of claim 13, wherein the first and second pieces of the housing are pivotally connected at a first end of the housing, and the locking member is positioned at a second end of the housing positioned opposite from the first end.

15. The anti-theft storage case of claim 14, wherein the housing includes first and second sides that extend between the first and second ends.

16. The anti-theft storage case of claim 15, wherein the first and second housing pieces include lateral reinforcement portions, located at the first and second sides of the housing, that overlap one another when the first and second pieces of the housing are in the closed position to resist lateral movement between the first and second pieces of the housing.

* * * * *